United States Patent [19]

Nágel et al.

[11] Patent Number: 5,006,489

[45] Date of Patent: Apr. 9, 1991

[54] SOLDERING ENAMEL FOR PREPARING AN END SEAL OF A CERAMIC DISCHARGE ENVELOPE OF A DISCHARGE LAMP

[75] Inventors: Ferenc Nágel; Mária J. Farkasné, both of Budapest, Hungary

[73] Assignee: Tungsram Reszvenytarsasag, Budapest, Hungary

[21] Appl. No.: 375,889

[22] Filed: Jul. 6, 1989

[30] Foreign Application Priority Data

Sep. 7, 1988 [HU] Hungary .............................. 4614/88

[51] Int. Cl.$^5$ .............................................. C03C 8/24
[52] U.S. Cl. ...................................... 501/15; 501/18; 501/41; 501/51; 501/23
[58] Field of Search ................. 501/15, 18, 41, 51, 501/134, 10, 23

[56] References Cited

U.S. PATENT DOCUMENTS 4,298,388  11/1981  Sack ........................................ 501/15
4,326,038   4/1982  Oda et al. .............................. 501/41
4,585,972   4/1986  Hing ........................................ 501/15

FOREIGN PATENT DOCUMENTS 0237103   9/1987  European Pat. Off. .
0033209   3/1978  Japan ..................................... 501/15
0041766   3/1983  Japan ..................................... 501/41
0190877  11/1983  Japan ..................................... 501/15

OTHER PUBLICATIONS

*Hacks Chemical Dictionary*, Third Edition, p. 529.

Primary Examiner—Karl Group
Attorney, Agent, or Firm—Michael N. Meller

[57] ABSTRACT

The soldering enamel is composed of a basic enamel consisting of aluminium oxide and a rare earth metal oxide and/or an alkali earth metal oxide and, in the given case, some other metallic or metalloid oxide, and of a ceramic filling material. The filling material is a zirconium-rare earth oxide of perovskite crystal structure. The quantity of the filling material amounts up to 5 mass % referred to the overall quantity of enamel.

2 Claims, No Drawings

SOLDERING ENAMEL FOR PREPARING AN END SEAL OF A CERAMIC DISCHARGE ENVELOPE OF A DISCHARGE LAMP

OBJECT OF THE INVENTION

The present invention refers to a soldering enamel suitable for preparing the end seal of a ceramic envelope of a discharge lamp.

In the course of manufacturing different kinds of discharge lamps and especially the high-pressure sodium vapour (HPS) lamps the step of sealing of the ceramic discharge envelope is the critical technological operation. In preparing the sealing of said discharge envelopes at least the currentinlets have to be fixed in a pressure-tight manner into the ceramic envelope but in many cases also the discharge envelope itself requires to be provided with a ceramic sealing element of ceramic plug also attached in a pressure-tight way to the adjacent part of the ceramic discharge envelope, this part being of tubular shape in most cases. For this purpose of fixing so-called enamel solders of different kinds are used. This is usually done so that from the enamel of suitable composition, a suitably matching element of proper shape, e.g. an enamel ring is formed, that is then put to the required place and by heating the assembly thus fitted together, the enamel is melted.

The molten enamel wets the parts to be soldered together and flows into the gaps between them. After cooling the assembly, the enamel solidifies, and a pressure-tight bond between the parts to be soldered together is ensured by this solid enamel. The quality of the bond formed this way is highly influenced by the phase composition of the solidified enamel. While solidifying, the enamels tend to take part in processes resulting in a lower or higher percentage of a glass phase. When in the solidified enamel a relatively large percentage of the glass phase is present, then it is susceptible to cracking and also its sodium resistance will be poor. Even if formation of the glassy phase is avoided, it will still be difficult to obtain a solidified enamel of satisfactory texture, i.e. of one consisting of the required phases. This is, however, of great importance, since formation of certain phases must by all means be avoided, namely of those which show a microporous zeolitelike structure, these phases being inclined to get bound to gases formed and also their sodium resistance is poor—and also the development of those phases should be prevented which are subject to phase transformation, while the discharge lamp is heated to service temperature. These unwanted phases are likely to appear, if the formation rate of solidification nuclei, around which the desired phases develop, is unsatisfactory and if the enamel is prone to undercooling.

To obtain a solidified enamel of the required fine structure and consisting of the required phases, it is expedient to admix to the base enamel composition from some dope capable of promoting the nucleation process, the dope consisting of a melt not prone to undercooling. Namely in that case the speed of the nucleation process will not influence the quality of enamel. Under the effect of these implanted crystal grains the solidification process sets in simultaneously within the mass of enamel still in liquid phase, so as if the matter were "hogged away" from other undesirable phases, and on the other hand, by locally modifying the composition of the melt, solidification of undoped, but desirable phases also sets in. These crystal grains remain partly in solid state during the soldering-in process. (This obviously also depends on the soaking time.) The structure of said grains adjusts itself to the formation of the required phase, while also their grain size is uniform, remains in conformity with the fine structure.

The method of using nuclei forming dopes in the technical art of the present application is already known. So, in the U.S. Pat. No. 4,585,972, admixture to the enamel of 2 to 5 mass % phosphorous pentoxide, titanium dioxide, zirconium dioxide or chromium trioxide individually or in any arbitrary combination is proposed.

It is a known method as well to add to the enamel a ceramic filling having the additional property of expediting uniform solidification of the enamel, as stated in the European patent application No. EP 237 103. In that specification, admixture of 20 to 50 percent of a filling consisting of any one or any combination of the following substances is proposed: aluminium dioxide, thorium dioxide, uranium dioxide and, advantageously, hafnium dioxide. The use of a such high rate of the filing material is disadvantageous because it has the adverse effect of rendering the enamel thixotropic, impending easy intrusion of the enamel into the gaps to be soldered.

SUMMARY OF THE INVENTION

The present invention is directed to creating an improved soldering enamel showing low thixotropy, the required fine structure and phase composition in spite of applying a filling material.

The present invention is based on the recognition that the filling material should be also the additive improving the nucleation process. This requires lowering the amount of the filling material and therefore it is of advantage to use a single kind of dope fulfilling alone both tasks analyzed above. So the quantity of the dope need not be as much as to fill out at least 1/5 part of the volume, but its composition and crystal structure have to comply with those specified. So it is proposed to use perovskites characterized by some rare earth metal content as a combined nuclei forming dope and filling material.

Based on the recognition, illustrated above, a soldering enamel for preparing an end seal of a ceramic discharge envelope of a high-pressure discharge lamp was developed which comprises a basic enamel composed of aluminium oxide and a rare earth metal oxide and/or alkaline earth metal oxide and in the given case, of some other metallic or metalloid oxide, and contains a ceramic filling material, wherein the novel feature is that this ceramic filling material is a zirconium-rare earth oxide of perovskite crystal structure and the amount of the filling material is at most 5 mass % of the overall mass of the basic enamel, for facilitating the nucleation process in a mixture of low thixotropy. In a preferred embodiment the soldering enamel of the invention comprises at most 1 mass % zirconium-rare earth oxide perovskite, which is advantageously the compound of general formula $Y_{0.29377}Zr_{1.32468}O_3$ present in the rate 0.1 to 0.9 mass %.

The crystals of perovskite structure can be described by the general formula $ABO_3$, where A and B stand for cations of different ionic radii. In filling materials to soldering enamels more substances are suitable and especially those perovskites where A is zirconium, and B is a rare earth metal with yttrium included. The yttrium oxide combined with zirconium oxide has been found to be the best. With that way of notation, in the summation formula of said dope found to be the most favourable, the quantity of metal ions cannot be equal to a round number. One of the dopes that have been proven as best may be described as $Y_{0.29377}Zr_{1.32468}3$. However, some deviation in stoechiometric quantity is of no importance from the point of view of feasability as additive, only the crystal structure is decisive.

Yttrium-zirconium perovskite as additive is very suitable, because a much lower amount of this dope has been found sufficient as compared to other known additives, to ensure formation of the required fine structure during and after solidification of the enamel. Namely, as it was mentioned above, the use of too much filling material has the adverse effect of rendering the enamel thixotropic, impeding easy intrusion into the gaps between the units to be soldered. This is an important aspect, since the width of gaps to be filled up in the course of sealing the discharge envelopes does not exceed 100 $\mu$m, i.e. the gaps in question are very narrow, and the gap widths can by no means be regarded as being throughout uniform either. Just these irregularities have to be eliminated by filling out the gaps with the enamel solder. That is why a well-flowing enamel is required, which properly wets the parts to be soldered in. In order to ensure this property of good flowing, the amount of filling material must not be chosen to be too abundant. Therefore, the use of the substances with perovskite structure as proposed is very favourable, since in many cases an amount of 0.5 mass % this additivie is sufficient for obtaining a good enamel bond.

DESCRIPTION OF THE PREFERRED EMBODIMENTS

To describe the present invention is more detail some non-restrictive examples will be presented. Obviously, within the scope of protection provided by the claims, innumerable other variations are possible (within the idea of the invention), that can be conceived without any difficulty by anyone experienced in the field given.

EXAMPLE 1

For preparing an yttrium-zirconium-perovskite in a mixture
37.2 g yttrium oxalate ($Y_2C_6O_{12}.9H_2O$) and
299.72 g zirconium nitrate ($Zr(NO_3)_4.5H_2O$)
are ground together.

The ground mixture is put in an aluminium oxide boat and heated in a muffle furnace at 1600° C. for 30 minutes. In the course of this heating no 100% transformation will take place. By repeated heating the degree of transformation can be improved. This improvement, however, is not always necessary. The material proposed is capable of exerting its beneficial effect also without second heating during solidification of the enamel. Namely, the residual non-transformed oxides in amounts associated with the process taking place here have no adverse effect on the properties of enamels either of the calcium aluminate or of the aluminium oxide/rare earth basis. Should the crystal water content of the starting material considerably-say by 10 to 20 mol %-differ from that specified, the difference has to be taken into account. Smaller differences may be neglected. After heating the materials suffer a small degree of sintering. The sintered material has to be ground in an aluminium oxide mill to reduce the grain size. Preferred grain size is between 1 to 5 $\mu$m. An excessive quantity of grains smaller than the specified lower limit is undesirable, since such grains will melt into the base enamel during soldering and will be impended in exerting its desired effect as filling material. Particles of grain sizes larger than the specified upper limit, on the one hand, encumber the preparation of the enamel ring and on the other hand, will fail to provide a sufficient number of nuclei in the microcrystal structure of the given volume of the basic enamel.

EXAMPLE 2

To a moulding powder consisting of a ground powder of
33.2 mass % $Al_2O_3$, 52.6 mass % $CaCO_3$,
3.7 mass % $Y_2O_3$ and 10.5 mass % $SrCO_3$
mixed together with a few mass % of some organic binding material, e.g. PVA (polyvinyl-alcohol), then 0.5 mass % the material prepared according to Example 1 is admixed (instead of carbonates and oxides, oxalates and nitrates can equally be used, provided their molar quantities correspond to those specified above). In that case the organic binding material can be omitted. From the moulding powder thus prepared a ring (or circlet) was pressed in an otherwise known way, then this moulded ring was heated up to 1240°-1260°C. slowly, through several hours and kept at the temperature for a period of 1 hour. The glowed enamel ring can be used (preferably at once) for the sealing of ceramic discharge envelopes of sodium lamps. The assembled fitting can then be soldered together at 1450° C. The heating-up time depends on the design of the oven and lamp body.

The duration of holding time is 1 to 2 minutes. The rate of cooling is determined by that of the oven.

EXAMPLE 3

A mixture consisting of
331.4 g of $Al_2O_3$, 84.5 g of $Sc_2O_3$,
53.3 g of $Y_2O_3$ and 243.1 g $La_2O_3$
was ground and melted and, after cooling, grinding was carried on until the grain size was reduced to 3 to 5 $\mu$m. To this powder 1.5 g of the material prepared according to Example 1 and an organic binding material (e.g. PVA) facilitating the process of moulding were admixed.

A ring was moulded from the above mixture of powders and by slow heating through several hours its temperature was raised to 1450°-1500° C. and kept there for 30 minutes.

The enamel ring can be used for fixing the ceramic discharge envelope of sodium lamps by soldering, in a way similar to those described in the preceding examples with the difference that the soldering temperature is max. 1670° C.

What we claim is:

1. A soldering enamel composition for preparing an end seal of a ceramic discharge envelope of a high-pressure discharge lamp, comprising a basic enamel including aluminum oxide and at least one oxide selected from the group consisting of rare earth metal oxides, alkaline earth metal oxides, and mixtures thereof and containing a ceramic filling material, being a zirconium-rare earth oxide of perovskite crystal structure, wherein the amount of said ceramic filling material referred to the overall mass of said basic enamel is from 0.1 to 0.9 mass % of yttrium-zirconium oxide for facilitating the nucleation process and forming a mixture of low thixotropy during soldering.

2. The soldering enamel as set forth in claim 1, characterized in comprising said yttrium-zirconium oxide of perovskite crystal structure has a composition of the formula $Y_{0.29377}Zr_{1.32468}O_3$.

* * * * *